United States Patent
Okamoto

(10) Patent No.: US 9,113,056 B2
(45) Date of Patent: Aug. 18, 2015

(54) IMAGE CAPTURING APPARATUS AND INFORMATION PROCESSING APPARATUS

(71) Applicant: ASAHI KASEI KABUSHIKI KAISHA, Osaka (JP)

(72) Inventor: Akihiro Okamoto, Tokyo (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 14/352,371

(22) PCT Filed: Dec. 21, 2012

(86) PCT No.: PCT/JP2012/008206
§ 371 (c)(1),
(2) Date: Apr. 17, 2014

(87) PCT Pub. No.: WO2013/102979
PCT Pub. Date: Jul. 11, 2013

(65) Prior Publication Data
US 2014/0240546 A1    Aug. 28, 2014

(30) Foreign Application Priority Data
Jan. 6, 2012    (JP) .................................. 2012-001023

(51) Int. Cl.
*H04N 5/235*    (2006.01)
*G10L 21/00*    (2013.01)
(Continued)

(52) U.S. Cl.
CPC ............. *H04N 1/2129* (2013.01); *H04N 5/232* (2013.01); *H04N 5/772* (2013.01); *H04N 9/8063* (2013.01); *H04N 9/8205* (2013.01); *G03B 17/38* (2013.01); *G10L 2015/223* (2013.01)

(58) Field of Classification Search
CPC ... H04N 5/232; G10L 2015/223; G03B 17/38
USPC ........................................ 348/222.1; 704/275
See application file for complete search history.

(56) References Cited

U.S. PATENT DOCUMENTS 8,432,455 B2 *    4/2013    Tang et al. ............... 348/211.99
2008/0129854 A1    6/2008    Onoda et al.
(Continued)

FOREIGN PATENT DOCUMENTS

JP    01-191840 A    8/1989
JP    2006-090790 A    4/2006
(Continued)

OTHER PUBLICATIONS
International Search Report dated Jan. 29, 2013 for International Application No. PCT/JP2012/008206.
(Continued)

*Primary Examiner* — Tuan Ho
*Assistant Examiner* — Selam Gebriel
(74) *Attorney, Agent, or Firm* — Morgan, Lewis & Bockius LLP

(57) ABSTRACT

An image capturing apparatus includes a temporary image accumulating unit in which still images are stored, the still images being captured automatically and continuously regardless of an instruction of a user; an image capturing timing data storage unit in which image capturing timing data is stored, the image capturing timing data including speech information based on sound data and delay time information which are associated with each other; an image capturing timing data specifying unit specifying image capturing timing data containing speech information corresponding to the sound data from the plurality of image capturing timing data; a sound event detecting unit detecting a sound event from the sound data; and a temporary image selecting unit selecting the still image captured at a time before the sound event from the temporary image accumulating unit based on the sound event and the delay time of the specified image capturing timing data.

11 Claims, 9 Drawing Sheets

(51) Int. Cl.
*H04N 1/21* (2006.01)
*H04N 5/77* (2006.01)
*H04N 9/806* (2006.01)
*H04N 9/82* (2006.01)
*H04N 5/232* (2006.01)
*G03B 17/38* (2006.01)
*G10L 15/22* (2006.01)

(56) References Cited

U.S. PATENT DOCUMENTS

2009/0109297 A1* 4/2009 Nakagawa et al. ........ 348/222.1
2010/0026815 A1* 2/2010 Yamamoto ................. 348/207.1

FOREIGN PATENT DOCUMENTS

JP 2008-302146 A 12/2008
JP 2010-226675 A 10/2010
JP 2012-098652 A 5/2012

OTHER PUBLICATIONS

International Preliminary Report on Patentability dated Jul. 8, 2014, for the corresponding international application No. PCT/JP2012/008206.

European Search Report dated May 29, 2015, for corresponding European patent Application No. 12864466.3.

* cited by examiner

FIG. 2

| ID NUMBER | DELAY TIME INFORMATION | SPEECH INFORMATION |
|---|---|---|
| 1 | −2 SECONDS | B AE K |
| 2 | −1 SECOND | B AE K AH L IH T AH L |
| 3 | +2 SECONDS | CH IY Z |

IMAGE CAPTURING APPARATUS AND INFORMATION PROCESSING APPARATUS

TECHNICAL FIELD

The present invention relates to an image capturing apparatus and an information processing apparatus.

BACKGROUND ART

Currently, in the field of camera, a camera including a function for recognizing a speech is available. Such a camera extracts, for example, a preset word such as "Say cheese" from a recognized speech. Then, after the elapse of a certain period of time from a timing when the extracted word has been uttered, the camera operates so that a shutter is automatically released.

The aforementioned camera is described, for example, in PTL 1. The invention described in PTL 1 allows an operator of the camera to take a natural photograph that matches with the motion of a subject. Further, PTL 1 describes that a time from the timing of an utterance to a shutter release (hereinafter, referred to as a delay time) is arbitrary set.

CITATION LIST

Patent Literature

PTL 1: JP 1-191840 A

SUMMARY OF INVENTION

Technical Problem

However, the aforementioned publicly-known camera initiates image capturing at a time after the elapse of a certain period of time from an utterance. Therefore, when an image capturing timing has already been missed, nothing can be done about this situation.

As a method for preventing missing an image capturing timing, it is conceivable to automatically capture still images in addition to image capturing at a timing instructed by the user, and store the automatically captured images in a memory. However, in this method, a user is required to find an image desired by the user from a large number of images that have been automatically captured, thus the user has to spend much time and effort.

The present invention has been made in view of such circumstances, and the present invention is to provide an image capturing apparatus and an information processing apparatus capable of presenting an image desired by a user without missing an image capturing timing and without forcing the user to spend much time and effort.

Solution to Problem

According to one aspect of the present invention, there is provided an image capturing apparatus including: a sound obtaining unit (e.g., a sound obtaining unit 102 illustrated in FIG. 1) configured to output an obtained sound as sound data; an image capturing unit (e.g., an image capturing unit 101 illustrated in FIG. 1) configured to capture a still image in accordance with an image capturing instruction of a user and to capture still images automatically regardless of the image capturing instruction of the user; a temporary image accumulating unit (e.g., a temporary image accumulating unit 104 illustrated in FIG. 1) in which image data of the still images captured automatically and continuously by the image capturing unit are stored; an image capturing timing data storage unit (e.g., an image capturing timing data storage unit 201 illustrated in FIG. 1) in which image capturing timing data is stored, the image capturing timing data including speech information and delay time information which are associated with each other; an image capturing timing data specifying unit (e.g., an image capturing timing data specifying unit 202 illustrated in FIG. 1) configured to specify the image capturing timing data containing the speech information corresponding to the sound data output by the sound obtaining unit, from a plurality of the image capturing timing data stored in the image capturing timing data storage unit, based on the sound data output by the sound obtaining unit; a sound event detecting unit (e.g., a sound event detecting unit 203 illustrated in FIG. 1) configured to detect a sound event indicating any one of an initiation of speech, a termination of the speech, an initiation of speech recognition processing, and a termination of the speech recognition based on the sound data; and a temporary image selecting unit (e.g., a temporary image selecting unit 204 illustrated in FIG. 1) configured to select the still image captured at a time before the sound event from the temporary image accumulating unit based on the sound event and a delay time of the image capturing timing data specified by the image capturing timing data specifying unit.

The sound event detecting unit may detect the sound event indicating the initiation of the speech or the termination of the speech based on the sound data.

The image capturing apparatus may further include an image display unit (e.g., an image display unit 205 illustrated in FIG. 1) configured to display the still image captured by the image capturing unit; and an image storage unit (e.g., an image storage unit 103 illustrated in FIG. 1) in which the still image captured by the image capturing unit is stored.

The image display unit may display the still image selected by the temporary image selecting unit and the still images captured at around a time of capturing the still image selected by the temporary image selecting unit from the still images stored in the temporary image accumulating unit.

The image data of the still image specified by the user from the still images displayed by the image display unit may be stored in the image storage unit.

Moreover, the image capturing apparatus may include a delay time measuring unit (e.g., a delay time measuring unit 211 illustrated in FIG. 4) configured to measure the delay time which is a difference between a time of capturing the still image specified by the user from the still images displayed by the image display unit and an occurrence time of the sound event detected by the sound event detecting unit; and an image capturing timing data generating unit (e.g., an image capturing timing data generating unit 212 illustrated in FIG. 4) configured to generate the image capturing timing data including the delay time information on the delay time measured by the delay time measuring unit and the speech information based on the sound data output by the sound obtaining unit, the delay time information and the speech information being associated with each other. The image capturing timing data generated by the image capturing timing data generating unit may be stored in the image capturing timing data storage unit.

The image capturing apparatus may include an image capturing initiation event detecting unit (e.g., an image capturing initiation event detecting unit 221 illustrated in FIG. 5) configured to detect an image capturing initiation event of image capturing of the image capturing unit in accordance with the image capturing instruction of the user; a delay time measuring unit (e.g., a delay time measuring unit 222 illustrated in FIG. 5) configured to measure the delay time which is a difference between an occurrence time of the image capturing initiation event detected by the image capturing initiation event detecting unit and an occurrence time of the sound event detected by the sound event detecting unit; and an image capturing timing data generating unit (e.g., an image capturing timing data generating unit 223 illustrated in FIG. 5) configured to generate the image capturing timing data including the delay time information on the delay time measured by the delay time measuring unit and the speech information based on the sound data output by the sound obtaining unit, the delay time information and the speech information being associated with each other. The image capturing timing data generated by the image capturing timing data generating unit may be stored in the image capturing timing data storage unit.

The image capturing apparatus may include an image capturing operation setting unit (e.g., an image capturing operation setting unit 231 illustrated in FIG. 6) configured to set an image capturing timing of the image capturing unit based on the sound event detected by the sound event detecting unit and the delay time of the image capturing timing data specified by the image capturing timing data specifying unit.

The image capturing operation setting unit configured to set a time after the sound event as the image capturing timing.

The image capturing apparatus may include a delay time correcting unit (e.g., a delay time correcting unit 241 illustrated in FIG. 7) configured to correct the delay time information contained in the image capturing timing data specified by the image capturing timing data specifying unit when data obtained by image capturing of the image capturing unit in accordance with the image capturing timing set by the image capturing operation setting unit is not stored in the image storage unit.

According to another aspect of the present invention, there is provided an information processing apparatus (e.g., an information processing apparatus 100 illustrated in FIG. 9) incorporated in an image capturing apparatus, the image capturing apparatus including: a sound obtaining unit (e.g., a sound obtaining unit 102 illustrated in FIG. 9) configured to output an obtained sound as sound data; and an image capturing unit (e.g., an image capturing unit 101 illustrated in FIG. 9) configured to capture a still image in accordance with an image capturing instruction of a user. The information processing apparatus includes: a sound event detecting unit (e.g., a sound event detecting unit 203 illustrated in FIG. 9) configured to detect a sound event indicating an initiation of speech or a termination of the speech based on the sound data output from the sound obtaining unit; an image capturing initiation event detecting unit (e.g., an image capturing initiation event detecting unit 221 illustrated in FIG. 9) configured to detect an image capturing initiation event of the image capturing unit in accordance with the image capturing instruction of the user; a delay time measuring unit (e.g., a delay time measuring unit 222 illustrated in FIG. 9) configured to measure a delay time which is a difference between an occurrence time of the image capturing initiation event detected by the image capturing initiation event detecting unit and an occurrence time of the sound event detected by the sound event detecting unit; an image capturing timing data generating unit (e.g., an image capturing timing data generating unit 223 illustrated in FIG. 9) configured to generate image capturing timing data including delay time information on the delay time measured by the delay time measuring unit and speech information based on the sound data output by the sound obtaining unit, the delay time information and the speech information being associated with each other; and an image capturing timing data storage unit (e.g., an image capturing timing data storage unit 201 illustrated in FIG. 9) in which the image capturing timing data generated by the image capturing timing data generating unit is stored.

Advantageous Effects of Invention

According to one aspect of the present invention, it is possible to provide an image capturing apparatus and an information processing apparatus capable of presenting an image desired by the user without missing an image capturing timing and without forcing the user to spend much time and effort.

BRIEF DESCRIPTION OF DRAWINGS

FIG. 2 is a diagram exemplifying image capturing timing data of the first embodiment of the present invention;

DESCRIPTION OF EMBODIMENTS

The first to seventh embodiments of the present invention will now be described.

(First Embodiment)

Figure 1:
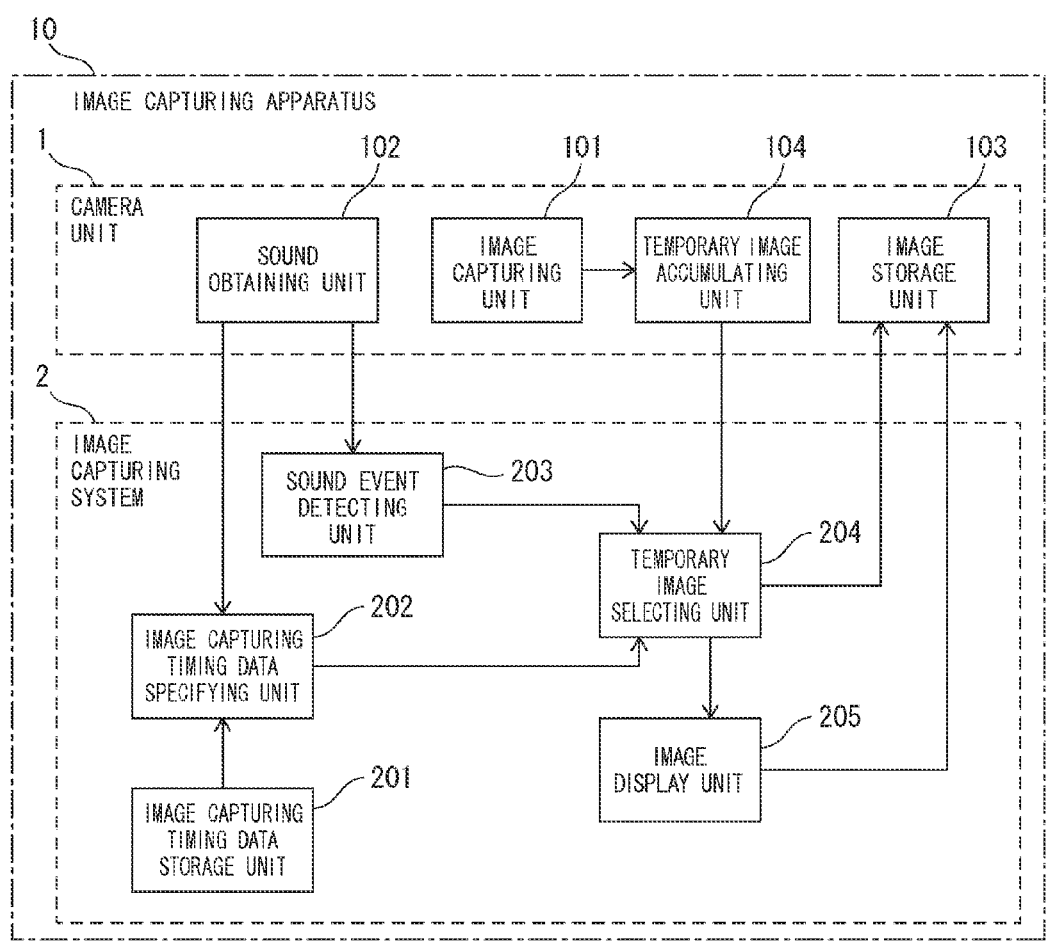
FIG. 1 is one example of a functional block diagram illustrating a configuration of an image capturing apparatus of a first embodiment of the present invention.

FIG. 1 is one example of a functional block diagram illustrating a configuration of an image capturing apparatus 10 of the first embodiment. It is noted that the image capturing apparatus 10 of the first embodiment is assumed to be a camera capturing still images.

(Configuration of the Image capturing apparatus)

The configuration illustrated in FIG. 1 includes a camera unit 1 and an image capturing system 2 incorporated in the image capturing apparatus 10. The camera unit 1 is mainly made of hardware. Further, the image capturing system 2 is implemented by data stored in a memory, not illustrated, of the image capturing apparatus 10 and a publicly-known microcomputer including a CPU (Central Processing Unit) and a memory, not illustrated, of the image capturing apparatus 10.

(Camera Unit 1)

As illustrated in FIG. 1, the camera unit 1 includes an image capturing unit 101, a sound obtaining unit 102 obtaining data of a sound generated by an utterance or the like (sound data), an image storage unit 103 in which data of a captured image is stored, and a temporary image accumulating unit 104. It is noted that the term "utterance or the like" is used to include a sound generated from a tool for emitting sound such as a dog whistle, in addition to an utterance.

(Image Capturing Unit 101)

The image capturing unit 101 includes a lens and a controller for the lens. The image capturing unit 101 includes both a function for capturing a still image by an image capturing instruction of the user and a function for capturing still images automatically and continuously regardless of the image capturing instruction of the user. The function for capturing still images automatically and continuously may always operate, and alternatively, an operation thereof may be initiated based on an instruction of the user.

(Sound Obtaining Unit 102)

The sound obtaining unit 102 outputs, as the sound data, a result obtained by converting an analog-input sound into digital data and analyzing the digital data. Specifically, the sound obtaining unit 102 has a configuration picking up a sound, performing an analog to digital conversion on the input sound, and then analyzing the input sound using Fourier transform or the like to obtain the sound data. When speech recognition processing is performed on the sound data using a hidden Markov model (hereinafter, referred to as "HMM"), a most likely phoneme sequence can be extracted from predetermined phoneme sequences. In the first embodiment, as one example, the extracted phoneme sequence (alternatively, it may be a phonetic symbol sequence) is designated as speech information. Since speech recognition processing according to HMM is a publicly-known technique, a more detailed description will be omitted. The sound data referred to in the first embodiment refers to a data group obtained by performing an analog-digital conversion on a sound, and then analyzing the sound using Fourier transform or the like.

(Image Storage Unit 103)

The image storage unit 103 includes a memory in which images stored as data and a program controlling operations of the memory.

An image captured by the image capturing unit 101 is non-temporarily stored in the image storage unit 103. Specifically, a still image captured by the image capturing unit 101 in accordance with an image capturing instruction of the user, an image selected by the user from still images stored in the temporary image accumulating unit 104 to be described later, and the like are stored in the image storage unit 103, as non-temporary data. Image data of a still image captured by the image capturing unit 101 and the time when the still image has been captured may be stored in association with each other in the image storage unit 103.

(Temporary Image Accumulating Unit 104)

The temporary image accumulating unit 104 includes a memory in which images are accumulated as data and a program controlling operations of the memory.

Data including image data of still images automatically captured by the image capturing unit 101 and image capturing times thereof, the image data of each of the still images being associated with the image capturing time thereof, is stored in the temporary image accumulating unit 104. In light of the memory capacity, it is preferable to discard data stored in the temporary image accumulating unit 104 after a lapse of a certain period of time. It is preferable to set the certain period of time in consideration of a delay time stored in an image capturing timing data storage unit 201 to be described later.

The aforementioned "image capturing time" is measured, for example, using a clock incorporated in a camera.

The "image capturing time" may be the time itself (absolute time) measured by the clock incorporated in the camera or an elapsed time (relative time) from a starting point such as a camera activation time or an image capturing initiation time point.

Further, in the same manner, in light of the memory capacity and the processing amount, it is preferred that the still images automatically captured by the image capturing unit 101 be stored in the temporary image accumulating unit 104 with lower image quality (resolution/focus) than that of the still image captured by an image capturing instruction of the user.

Further, in light of the memory capacity and the processing amount, it is preferred that the still images automatically captured by the image capturing unit 101 be stored in the temporary image accumulating unit 104 only at the time before detection of a sound event by a sound event detecting unit 203 to be described later and not be stored anymore after detection of the sound event.

The image capturing system 2 includes the image capturing timing data storage unit 201, an image capturing timing data specifying unit 202, the sound event detecting unit 203, a temporary image selecting unit 204, and an image display unit 205.

(Image Capturing Timing Data Storage Unit 201)

The image capturing timing data storage unit 201 stores the image capturing timing data including the speech information and delay time information, which are associated with each other. FIG. 2 is a diagram exemplifying the image capturing timing data. The image capturing timing data illustrated in FIG. 2 includes the delay time information that is information on a delay time, the speech information (e.g., a phoneme sequence or a phonetic symbol sequence) on speech, and an ID number thereof. In the first embodiment, a combination of the speech information on speech and the ID number thereof is speech recognition dictionary data.

In the image capturing timing data illustrated in FIG. 2, the speech information (e.g., the phonetic symbol sequence of "B AE K") obtained by uttering "back" is stored as the speech recognition dictionary data of ID number 1, and the image capturing timing data is configured so that the ID number 1 is associated with the delay time information of "−2 seconds".

Further, the speech information (e.g., the phonetic symbol sequence of "B AE K AH L IH T AH L") obtained by uttering "back a little" is stored as the speech recognition dictionary data of ID number 2, and the image capturing timing data is configured so that the ID number 2 is associated with the delay time information of "−1 second".

The image capturing timing data may contain the delay time information having not only a minus value but also a plus value. For example, the speech information (e.g., the phonetic symbol sequence of "CH IY Z") obtained by uttering "cheese" may be stored as the speech recognition dictionary data of ID number 3, and the image capturing timing data may be configured so that by the ID number 3 is associated with the delay time information of "+2 seconds".

(Image Capturing Timing Data Specifying Unit 202)

Based on the sound data output by the sound obtaining unit 102 and the speech information (which is associated with an ID number) contained in the image capturing timing data, one image capturing timing data containing the most likely speech information is specified as a result of speech recognition processing of the sound data output by the sound obtaining unit 102 from plural image capturing timing data stored in the image capturing timing data storage unit 201.

Description will be omitted on speech recognition processing for selecting the most likely speech information from the sound data obtained from output of the sound obtaining unit 102 since a publicly-known method such as likelihood comparison in speech recognition processing using HMM and the like is applicable.

(Sound Event Detecting Unit 203)

The sound event detecting unit 203 detects the sound event indicating any one of the initiation of a speech, the termination of a speech, the initiation of speech recognition processing, and the termination of speech recognition processing from the sound data. Specifically, the sound event detecting unit 203 receives the sound data output by the sound obtaining unit 102 and detects the sound event and the time of the occurrence of the sound event. In the present embodiment, the initiation of an utterance or the like is designated as a speech initiation event, the termination of an utterance or the like is designated as a speech termination event, the initiation of speech recognition processing is designated as a speech recognition processing initiation event, and the termination of speech recognition processing is designated as a speech recognition processing termination event. Then, the speech initiation event, the speech termination event, the speech recognition processing initiation event, and the speech recognition processing termination event are collectively designated as the sound event.

In the first embodiment, the sound event detecting unit 203 detects, as the initiation of an utterance or the like, that an energy of the sound data (a sound signal) output by the sound obtaining unit 102 or a degree of a change in the energy has exceeded a first threshold value for the first time. Further, the sound event detecting unit detects, as the termination of the utterance or the like, that an energy of the sound signal or a degree of a change in the energy falls below a second threshold value to output the time of the termination of the utterance or the like.

The sound event detecting unit determines that the speech recognition processing initiation event occurs at the same time as the occurrence of the speech initiation event, or recognizes as the speech recognition processing initiation event, that the energy or the degree of the change therein exceeding the first threshold value is detected continuously at a certain number of times. Further, the sound event detecting unit determines that the speech recognition processing termination event occurs at the same time as the occurrence of the speech termination event, or recognizes the timing of determining a processing result after the elapse of a certain period of time from the speech termination event, as the speech recognition processing termination event. Then, the sound event detecting unit outputs the times of the speech recognition processing initiation event and the speech recognition processing termination event.

As the sound event detected by the sound event detecting unit 203, there are the speech initiation event, the speech termination event, the speech recognition processing initiation event, and the speech recognition processing termination event, however as the sound event, it is preferable to use either the speech initiation event or the speech termination event. The reason is that using either one of the speech initiation event or the speech termination event makes it possible to increase a possibility of presenting an image desired by the user.

(Temporary Image Selecting Unit 204)

The temporary image selecting unit 204 selects a still image captured at the time before the sound event from the temporary image accumulating unit 104 based on the sound event detected by the sound event detecting unit 203 and a delay time of the image capturing timing data specified by the image capturing timing data specifying unit 202.

Specifically, of the still images contained in the temporary image accumulating unit 104, the temporary image selecting unit 204 selects a still image captured at the time closest to the time prior to the delay time of the image capturing timing data specified by the image capturing timing data specifying unit 202 from the time of the sound event detected by the sound event detecting unit 203. However, it is not always necessary to select only a still image captured at the closest time, but it is possible to select the still image together with still images captured at around the closest time to some extent.

(Image Display Unit 205)

The image display unit 205 displays one or plural still images captured by the image capturing unit 101. Of the still images stored in the temporary image accumulating unit 104, the image display unit 205 displays one or plural still images selected by the temporary image selecting unit 204. In addition to one or plural still images selected by the temporary image selecting unit 204, a part or all of the still images stored in the temporary image accumulating unit 104 may be displayed. Upon display, display is preferably performed in ascending or descending order of image capturing time.

The image display unit 205 includes selection means for selecting a displayed still image by the user such as a touch panel function and the like, and is configured so that the user can select the displayed still image. Of the still images displayed on the image display unit 205, data of an image selected by the user is transmitted to the image storage unit 103 to be stored thereon as non-temporary data.

Next, an operation of the above-described image capturing apparatus 10 will be described.

Figure 3:
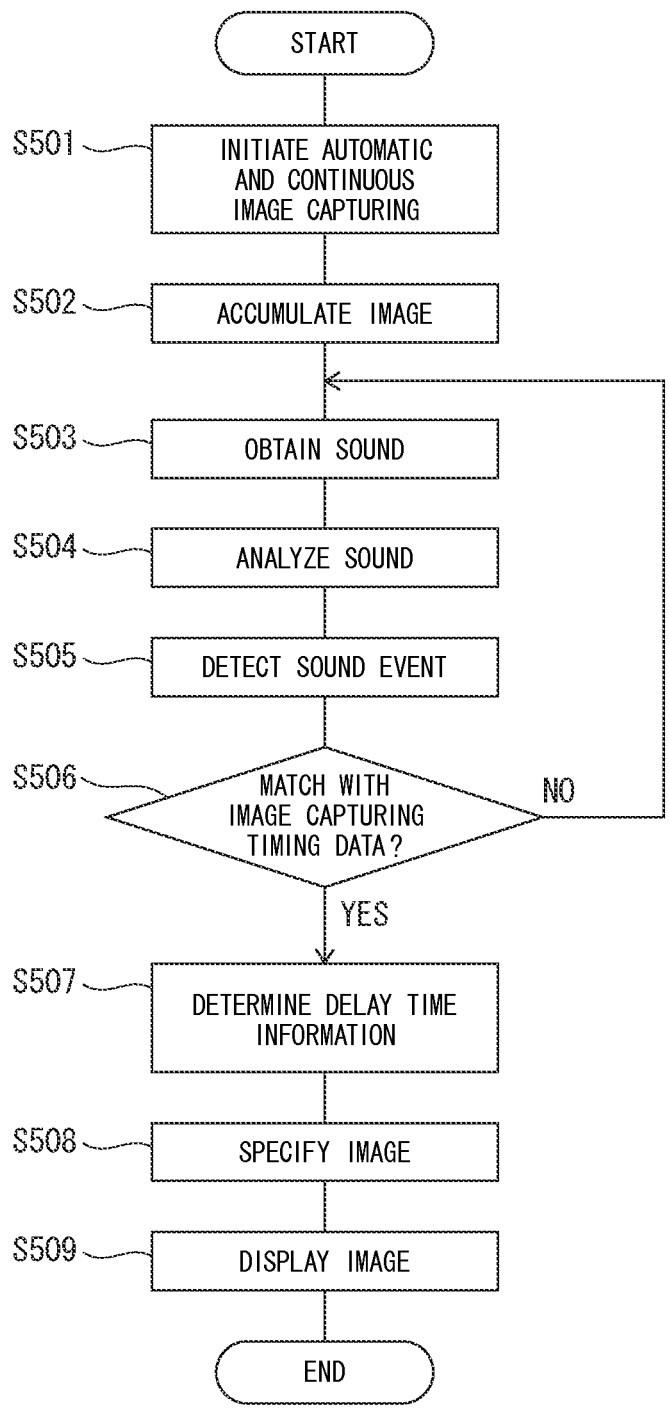
FIG. 3 is one example of a flowchart illustrating an operation of the image capturing apparatus of the first embodiment of the present invention.

FIG. 3 is a flowchart illustrating an operation of the image capturing apparatus 10 of the first embodiment.

First, the image capturing apparatus 10 initiates automatic and continuous image capturing by the image capturing unit 101 based on an instruction of system activation by the user (step S501).

Images captured by the automatic and continuous image capturing are stored in the temporary image accumulating unit 104 (step S502).

When the user makes a sound in this state, the sound obtaining unit 102 obtains the sound (step S503).

The sound obtaining unit 102 analyzes the obtained sound, converts the obtained sound into the sound data, and outputs the sound data to the sound event detecting unit 203 and the image capturing timing data specifying unit 202 (step S504).

The sound event detecting unit 203 analyzes the sound data output by the sound obtaining unit 102 and detects the sound event and the occurrence time thereof. The sound event detecting unit transmits the detected sound event and the occurrence time to the temporary image selecting unit 204 (step S505).

The image capturing timing data specifying unit 202 performs speech recognition processing (matching processing by HMM) on the speech information contained in the image capturing timing data stored in the image capturing timing data storage unit 201 and the sound data output by the sound obtaining unit 102 (step S506).

Then, when the image capturing timing data containing the speech information corresponding to the sound data is stored (step S506: Yes), the image capturing timing data is specified and then the delay time information of the specified image capturing timing data is transmitted to the temporary image selecting unit 204 (step S507).

When the image capturing timing data containing the speech information corresponding to the sound data is not stored (step S506: No), the process returns to the sound obtaining processing (step S503).

The temporary image selecting unit 204 selects a still image captured at the time before the sound event from the temporary image accumulating unit 104, based on the sound event detected by the sound event detecting unit 203 and the delay time of the image capturing timing data specified by the image capturing timing data specifying unit 202 (step S508). To describe in detail, the temporary image selecting unit selects a still image captured at the time (and several still images captured at around this time) closest to the time prior to the delay time of the image capturing timing data specified by the image capturing timing data specifying unit 202 from the occurrence time of the sound event detected by the sound event detecting unit 203, from the still images stored in the temporary image accumulating unit 104.

The image display unit 205 displays the still image selected by the temporary image selecting unit 204 (step S509).

According to the image capturing apparatus 10 of the first embodiment described above, still images are captured continuously and automatically, and stored. Then, the image display unit 205 displays a still image captured at the time prior to a predetermined delay time from the sound event corresponding to user uttering. Therefore, by referring to the still image displayed on the image display unit 205, the user can obtain a still image captured at a desired time prior to the timing of user uttering. In other words, when such a configuration is employed, a still image at the time close to a desired image capturing timing can be obtained, and therefore, it is possible to present an image desired by the user without missing an image capturing timing and forcing the user to spend much time and effort.

(Second Embodiment)

Next, the second embodiment of the present invention will be described.

Figure 4:
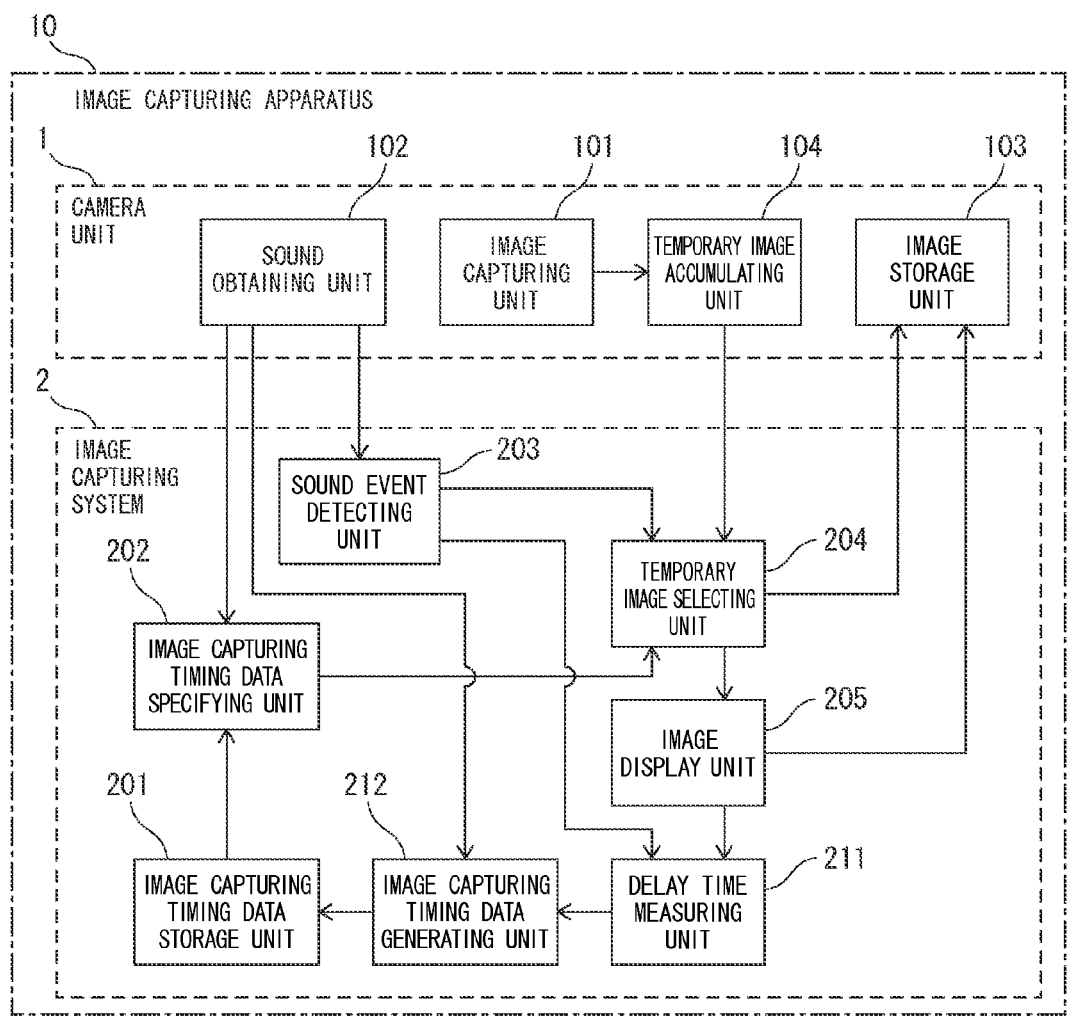
FIG. 4 is one example of a functional block diagram illustrating a configuration of an image capturing apparatus of a second embodiment of the present invention.

FIG. 4 is one example of a functional block diagram illustrating a configuration of an image capturing apparatus 10 in the second embodiment.

The image capturing apparatus 10 in the second embodiment is an image capturing apparatus capable of suitably setting the image capturing timing data stored in the image capturing timing data storage unit 201. In addition to the configuration of the image capturing apparatus 10 in the first embodiment, the image capturing apparatus 10 in the second embodiment further includes a delay time measuring unit 211 and an image capturing timing data generating unit 212. Except for the difference in a part of the processing of the image capturing timing data storage unit 201 due to the addition of the delay time measuring unit 211 and the image capturing timing data generating unit 212, the image capturing apparatus 10 in the second embodiment includes substantially the same functional configuration as the image capturing apparatus 10 in the first embodiment, and therefore, detailed description on the same units will be omitted.

(Delay Time Measuring Unit 211)

The delay time measuring unit 211 measures a delay time that is a difference between the time of capturing a still image specified by the user from plural still images displayed on the image display unit 205 and the occurrence time of the sound event detected by the sound event detecting unit 203.

Specifically, when the time at which the still image specified by the user from the still images displayed on the image display unit 205 has been captured is a time 3.5 seconds prior to the occurrence time of the sound event, the delay time measuring unit 211 measures the time of "−3.5 seconds". The delay time measuring unit 211 outputs the measured delay time to the image capturing timing data generating unit 212.

(Image Capturing Timing Data Generating Unit 212)

The image capturing timing data generating unit 212 generates the image capturing timing data including the delay time measured by the delay time measuring unit 211 and the speech information based on the sound data output by the sound obtaining unit 102, the delay time and the speech information being associated with each other.

Specifically, when the user utters "back" to the sound obtaining unit 102, the speech information (e.g., the phonetic symbol sequence of "B AE K") corresponding to the utterance of "back" is output to the image capturing timing data generating unit 212 from the sound obtaining unit 102, and further, the delay time (e.g., "−3.5 seconds") measured by the delay time measuring unit 211 is output to the image capturing timing data generating unit 212 from the delay time measuring unit 211.

The image capturing timing data generating unit 212 generates the image capturing timing data including the phonetic symbol sequence of "B AE K" and "−3.5 seconds" which are associated with each other. The generated image capturing timing data is output to the image capturing timing data storage unit 201 to be stored thereon.

(Image Capturing Timing Data Storage Unit 201)

The image capturing timing data generated by the image capturing timing data generating unit 212 is stored in the image capturing timing data storage unit 201 in the second embodiment stores. When the image capturing timing data containing the speech information which is the same as the speech information contained in the image capturing timing data generated by the image capturing timing data generating unit 212 has already been stored in the image capturing timing data storage unit 201, the image capturing timing data storage unit 201 may correct the delay time information of the image capturing timing data containing the same speech information to the delay time information of the image capturing timing data generated by the image capturing timing data generating unit 212.

Specifically, it is assumed that, for example, the image capturing timing data including the phonetic symbol sequence of "B AE K" as the speech information and the delay time information "−2.0 seconds" which are associated with each other, has already been stored in the image capturing timing data storage unit 201. Further, it is assumed that the image capturing timing data generated by the image capturing timing data generating unit 212 is the image capturing timing data including the phonetic symbol sequence of "B AE K" as the speech information and the delay time information "−3.5 seconds" which are associated with each other.

In this case, the image capturing timing data storage unit 201 corrects the delay time information associated with the phonetic symbol sequence of "B AE K" as the speech information, from "−2.0 seconds" to "−3.5 seconds".

Employing the configuration of the second embodiment makes it possible to set a preferable condition suitable for users as the image capturing timing data stored in the image capturing timing data storage unit 201.

(Third Embodiment)

Next, the third embodiment of the present invention will be described.

Figure 5:
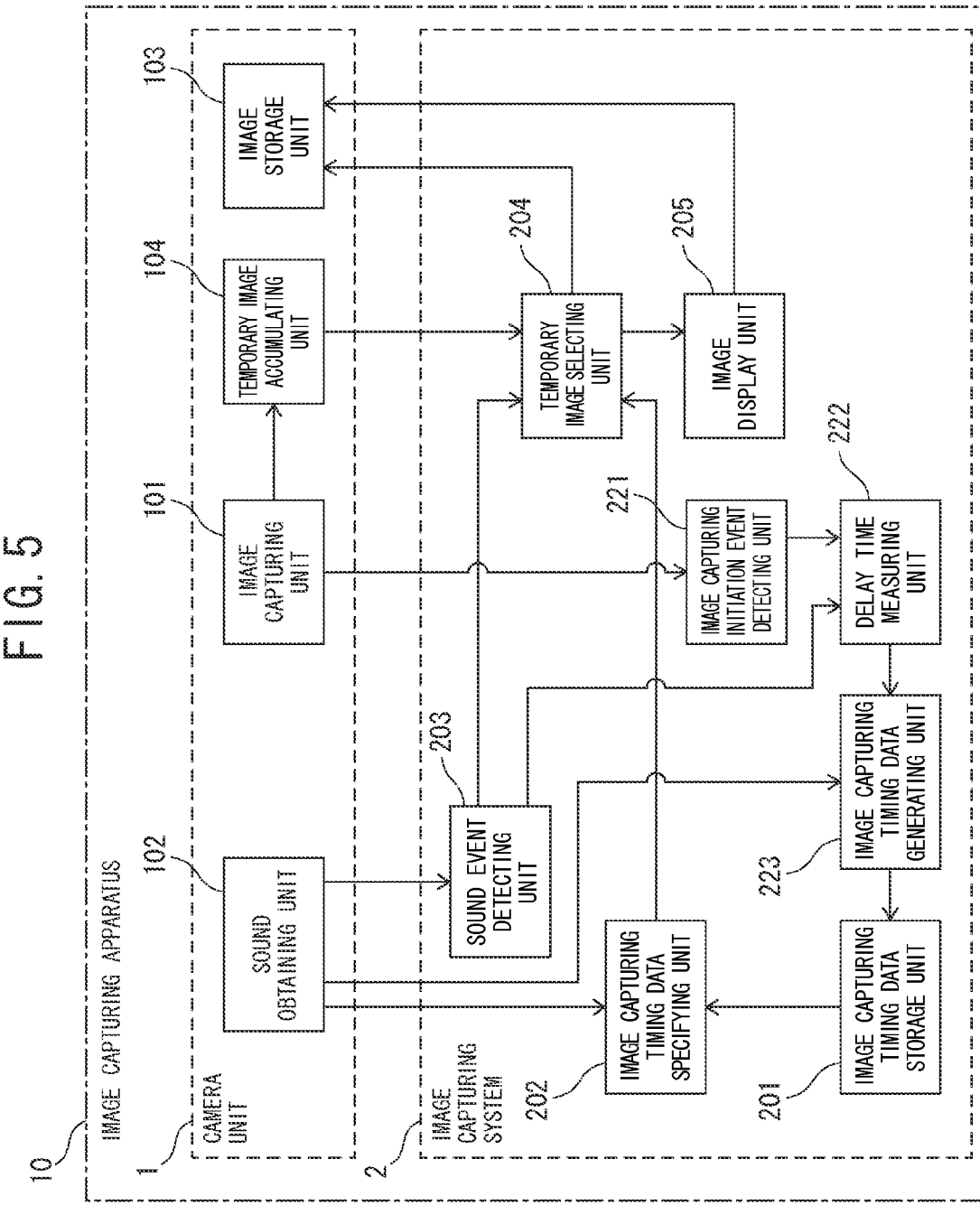
FIG. 5 is one example of a functional block diagram illustrating a configuration of an image capturing apparatus of a third embodiment of the present invention.

FIG. 5 is one example of a functional block diagram illustrating a configuration of an image capturing apparatus 10 in the third embodiment.

The image capturing apparatus 10 in the third embodiment is an image capturing apparatus capable of suitably setting the image capturing timing data stored in the image capturing timing data storage unit 201. In addition to the configuration of the image capturing apparatus 10 in the first embodiment, the image capturing apparatus 10 in the third embodiment further includes an image capturing initiation event detecting unit 221, a delay time measuring unit 222, and an image capturing timing data generating unit 223. Except for the difference in a part of the processing of the image capturing timing data storage unit 201 due to the addition of the image capturing initiation event detecting unit 221, the delay time measuring unit 222 and the image capturing timing data generating unit 223, the image capturing apparatus 10 in the third embodiment includes substantially the same functional configuration as the image capturing apparatus 10 in the first embodiment, and therefore, detailed description on the same units will be omitted.

(Image Capturing Initiation Event Detecting Unit 221)

The image capturing initiation event detecting unit 221 detects an image capturing initiation event of the image capturing unit 101 by an image capturing instruction of the user and the time thereof. Specific examples of the image capturing initiation event include releasing manually the shutter of the image capturing unit 101 by the user and the like.

(Delay Time Measuring Unit 222)

The delay time measuring unit 222 measures a delay time that is a difference between the occurrence time of the image capturing initiation event detected by the image capturing initiation event detecting unit 221 and the occurrence time of the sound event detected by the sound event detecting unit 203.

As a specific example, when the shutter of the image capturing unit 101 is manually released by the user 2 seconds after the user has uttered "cheese", "2 seconds" that is the difference between occurrence times of the sound event and the image capturing initiation event is measured by the delay time measuring unit 222.

(Image Capturing Timing Data Generating Unit 223)

The image capturing timing data generating unit 223 generates the image capturing timing data including the delay time measured by the delay time measuring unit 222 and the sound data output by the sound obtaining unit 102, the delay time and the sound data being associated with each other.

Specifically, when the user utters "cheese" to the sound obtaining unit 102, the speech information (e.g., the phonetic symbol sequence of "CH IY Z") corresponding to the utterance of "cheese" is output to the image capturing timing data generating unit 223 from the sound obtaining unit 102. Further, the delay time (e.g., "2 seconds") measured by the delay time measuring unit 222 is output to the image capturing timing data generating unit 223 from the delay time measuring unit 222.

The image capturing timing data generating unit 223 generates the image capturing timing data including the phonetic symbol sequence of "CH IY Z" and "+2 seconds" which are associated with each other. The generated image capturing timing data is stored in the image capturing timing data storage unit 201.

(Image Capturing Timing data Storage Unit 201)

The image capturing timing data generated by the image capturing timing data generating unit 223 is stored in the image capturing timing data storage unit 201. When the image capturing timing data containing the speech information which is the same as the speech information contained in the image capturing timing data generated by the image capturing timing data generating unit 223 has already been stored in the image capturing timing data storage unit 201, the image capturing timing data storage unit 201 may correct the delay time information of the image capturing timing data containing the same the speech information to the delay time information of the image capturing timing data generated by the image capturing timing data generating unit 223.

Employing the configuration of the image capturing apparatus 10 in the third embodiment makes it possible to set a preferable condition suitable for users as the image capturing timing data stored in the image capturing timing data storage unit 201.

(Fourth Embodiment)

Next, the fourth embodiment of the present invention will be described.

In addition to the configuration of the image capturing apparatus 10 in any one of the first to third embodiments, an image capturing apparatus 10 in the fourth embodiment further includes an image capturing operation setting unit 231.

Description is given here on a case in which the image capturing apparatus 10 in the first embodiment further includes the image capturing operation setting unit 231. The same signs are assigned to the same units as in the image capturing apparatus 10 in the first embodiment, and therefore, detailed description thereon will be omitted.

Figure 6:
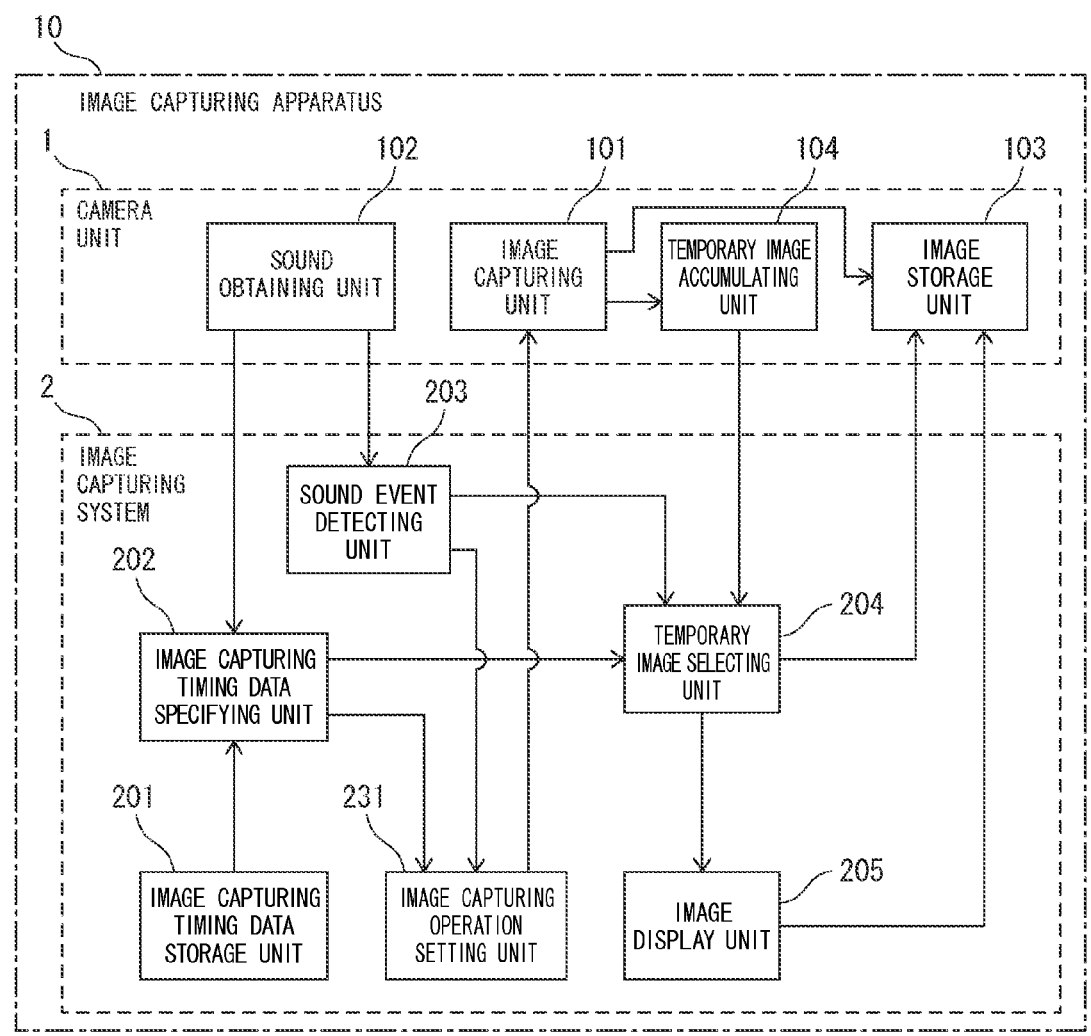
FIG. 6 is one example of a functional block diagram illustrating a configuration of an image capturing apparatus of a fourth embodiment of the present invention.

FIG. 6 is one example of a functional block diagram illustrating a configuration of the image capturing apparatus 10 in the fourth embodiment.

(Image Capturing Operation Setting Unit 231)

The image capturing operation setting unit 231 sets an image capturing timing of the image capturing unit 101 based on the sound event detected by the sound event detecting unit 203 and the delay time of the image capturing timing data specified by the image capturing timing data specifying unit 202.

Specific description will be given in the following.

It is assumed that the image capturing timing data including the speech information (e.g., the phonetic symbol sequence of "CH IY Z") obtained by an utterance of "cheese" by the user and the delay time information (e.g., "+2 seconds") which are associated with each other has been stored in the image capturing timing data storage unit 201.

When the user utters "cheese" to the sound obtaining unit 102, the sound obtaining unit 102 outputs the sound data corresponding to "cheese" to the sound event detecting unit 203 and the image capturing timing data specifying unit 202.

The sound event detecting unit 203 detects the sound event and the time thereof using the sound data output by the sound obtaining unit 102. The sound event detecting unit 203 output the detected time of the sound event to the image capturing operation setting unit 231.

The image capturing timing data specifying unit 202 performs speech recognition processing based on the sound data output by the sound obtaining unit 102 and the speech information contained in the image capturing timing data, specifies the image capturing timing data containing the most likely speech information from plural image capturing timing data stored in the image capturing timing data storage unit 201, and outputs the delay time contained in the specified image capturing timing data to the image capturing operation setting unit 231. In the present specific example, the delay time "+2 seconds" is output to the image capturing operation setting unit 231.

The image capturing operation setting unit 231 issues a command to the image capturing unit 101 to capture an image at the time 2 seconds after the occurrence time of the sound event. At this time, a command may be issued to the image capturing unit 101 so as to also capture several images at around the time when the delay time has been elapsed from the occurrence time of the sound event.

The image capturing operation setting unit 231 sets an image capturing timing under the condition that the delay time of the image capturing timing data specified by the image capturing timing data specifying unit 202 is a positive value, and in other words, the time after the sound event is set as the image capturing timing. Image data captured by the image capturing unit 101 based on the command of the image capturing operation setting unit 231 is stored in the image storage unit 103. Since the image data captured by the image capturing unit 101 based on the command of the image capturing operation setting unit 231 is highly likely to be an image desired by the user, it is preferred that the image data captured by the image capturing unit 101 based on the command of the image capturing operation setting unit 231 be data having higher image quality (resolution/focus) than image data captured automatically and continuously by the image capturing unit 101.

Employing the configuration of the fourth embodiment allows the image capturing unit 101 to perform image capturing automatically at a preferable timing according to the sound event.

(Fifth Embodiment)

Next, the fifth embodiment of the present invention will be described.

Figure 7:
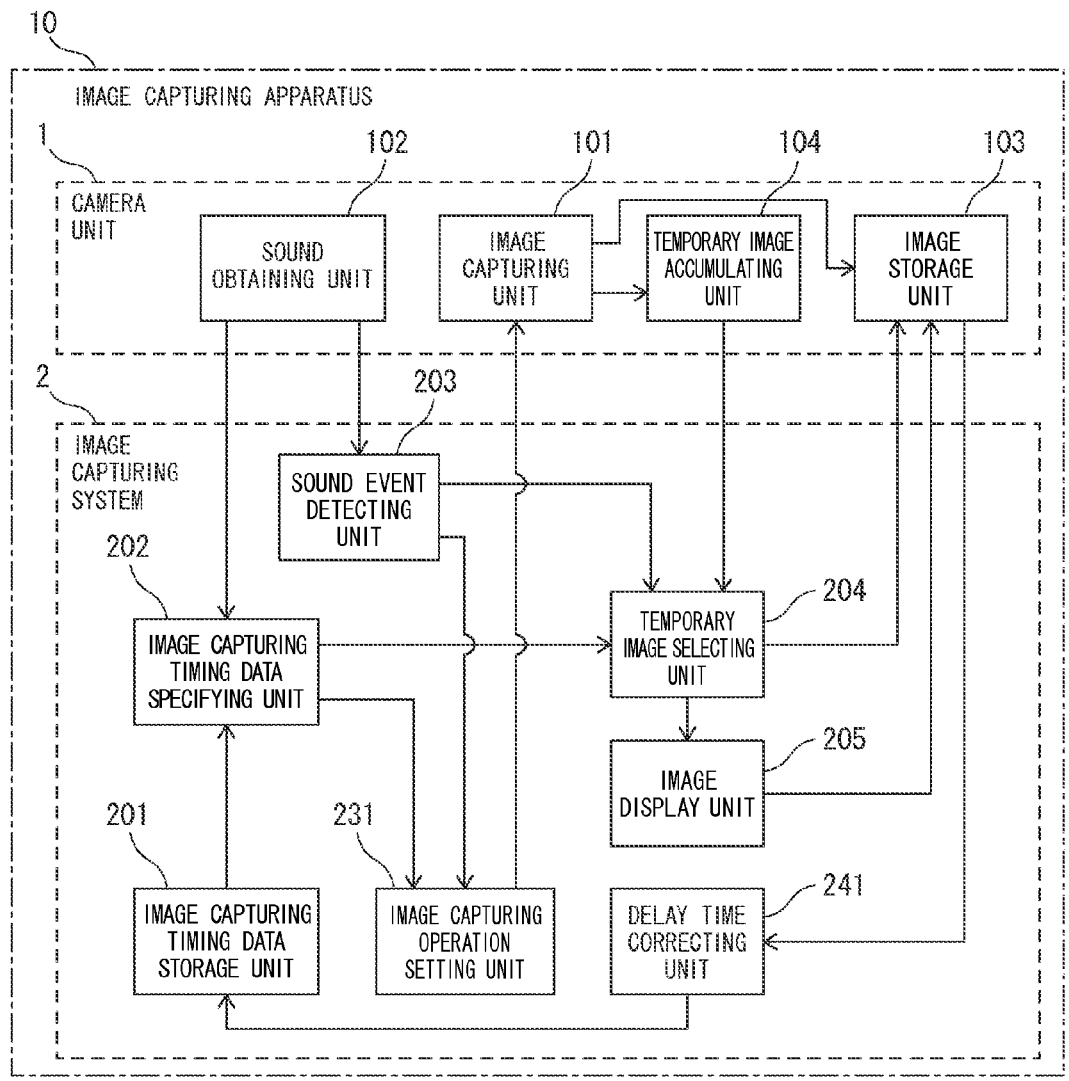
FIG. 7 is one example of a functional block diagram illustrating a configuration of an image capturing apparatus of a fifth embodiment of the present invention.

FIG. 7 is one example of a functional block diagram illustrating a configuration of an image capturing apparatus 10 in the fifth embodiment.

In addition to the configuration of the image capturing apparatus 10 in the fourth embodiment, the image capturing apparatus 10 in the fifth embodiment further includes a delay time correcting unit 241. Except for the difference in a part of the processing of the image storage unit 103 due to the addition of the delay time correcting unit 241, the image capturing apparatus 10 in the fifth embodiment includes substantially the same functional configuration as the image capturing apparatus 10 in the fourth embodiment, and therefore, detailed description on the same units will be omitted.

(Image Storage Unit 103)

An image captured by the image capturing unit 101 at an image capturing timing set by the image capturing operation setting unit 231 is stored in the image storage unit 103 in the fifth embodiment as image data. And the image storage unit 103 can detect whether the captured image has been stored or discarded.

When the image data has been discarded without being stored, the image storage unit 103 provides the delay time correcting unit 241 with an image discard notice.

(Delay Time Correcting Unit 241)

When data captured at the image capturing timing set by the image capturing operation setting unit 231 by the image capturing unit 101 has not been stored, the delay time correcting unit 241 corrects the delay time information contained in the image capturing timing data specified by the image capturing timing data specifying unit 202. To describe in detail, when the delay time correcting unit 241 receives the image discard notice output from the image storage unit 103, the delay time correcting unit 241 corrects a delay time of the image capturing timing data specified by the image capturing timing data specifying unit 202 from the image capturing timing data stored in the image capturing timing data storage unit 201.

Such a configuration presumes that the delay time has been inappropriate because of the discard of the captured image. Then, based on the fact that the shutter of the image capturing unit 101 has not been manually released by the user during a set delay time, the currently set delay time is presumed to be shorter than an appropriate delay time and then the delay time of the image capturing timing data is corrected to be extended.

Therefore, it is possible to set a preferable timing suitable for users as an image capturing timing set by the image capturing operation setting unit 231.

Further, in the fifth embodiment, the number of times and the frequency of the discard or store of image data may be recorded for each image capturing timing data. When the number of times and the frequency of the discard of image data are smaller than a threshold value with respect to a delay time being set, the delay time may remain uncorrected. In this way, when image data happens to be discarded due to a cause other than the delay time, an appropriately set delay time may be prevented from being changed.

Further, the extension of the delay time in the fifth embodiment can be realized, for example, by increasing a delay time before being corrected at a certain rate or adding a certain time to the delay time before being corrected. Still further, the certain time and the certain rate described above can be changed depending on the number of times and the frequency of the past discard or store of image data. The change may be made so that the larger the number of times of the discard of the image data is, the larger the certain rate and the certain time are set to be.

(Sixth Embodiment)

Next, the sixth embodiment of the present invention will be described.

Figure 8:
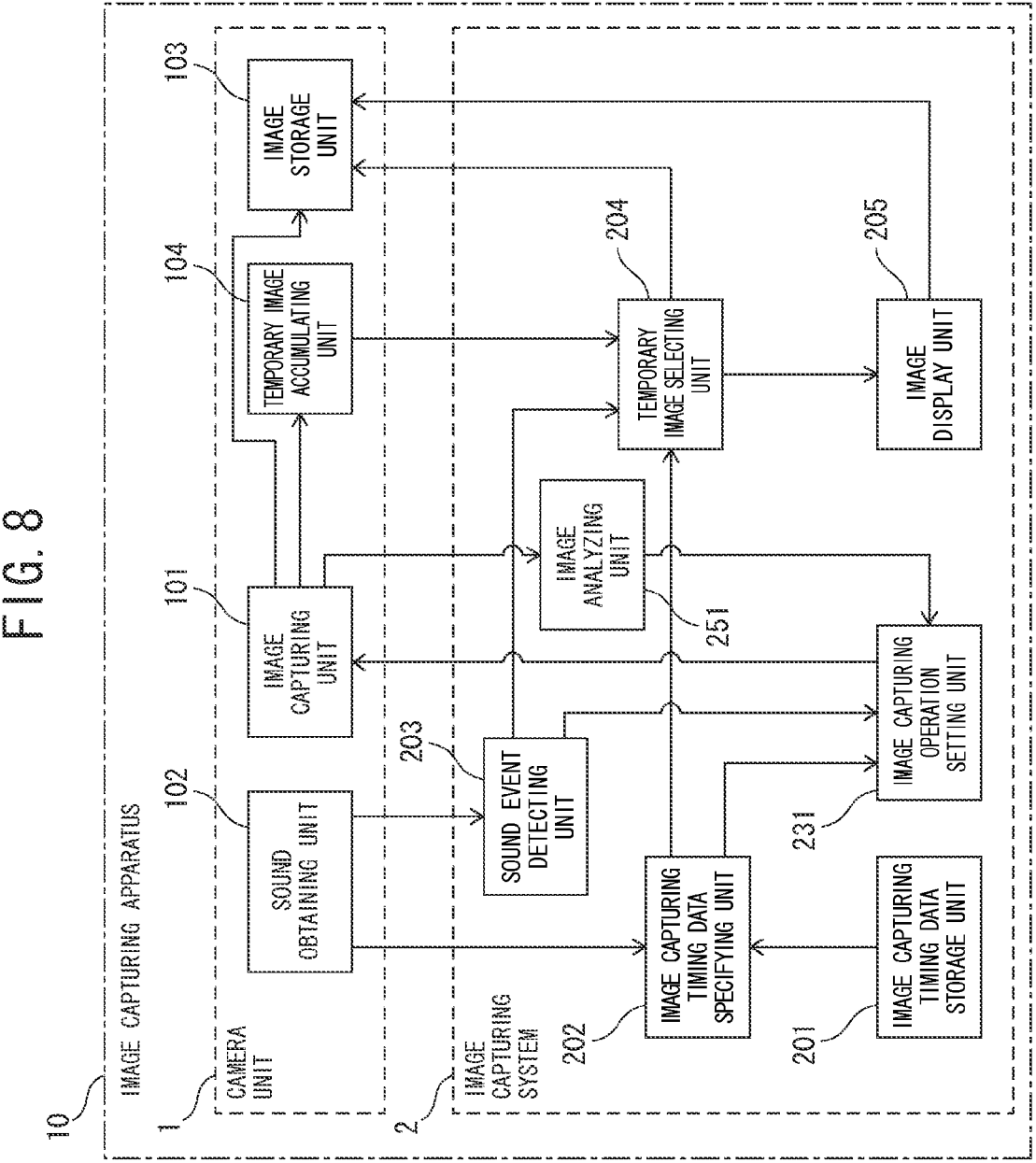
FIG. 8 is one example of a functional block diagram illustrating a configuration of an image capturing apparatus of a sixth embodiment of the present invention.

FIG. 8 is one example of a functional block diagram illustrating a configuration of an image capturing apparatus 10 in the sixth embodiment.

The image capturing apparatus 10 in the sixth embodiment further includes an image analyzing unit 251, in addition to the configuration of the image capturing apparatus 10 in the fourth embodiment or the fifth embodiment. Description is given here on a case in which the image analyzing unit 251 is added in the image capturing apparatus 10 in the fourth embodiment.

Except of the difference in a part of the processing of the image capturing operation setting unit 231 due to the addition of the image analyzing unit 251, the image capturing apparatus 10 in the sixth embodiment includes substantially the same functional configuration as the image capturing apparatus 10 in the fourth embodiment is provided, and therefore, detailed description on the same units will be omitted.

(Image Analyzing Unit 251)

The image analyzing unit 251 extracts shape change information on a shape change of an image capturing subject based on images captured by the image capturing unit 101. The shape change refers to a change in the appearance of an image capturing subject and corresponds to a change in the expression of a person or a change in the posture of an animal. Since detection of the shape change is a publicly-known technique in the field of an image capturing apparatus and others, further description will be omitted.

When the image analyzing unit 251 detects that, for example, a person has smiled, the image analyzing unit 251 notifies the image capturing operation setting unit 231 of a detection result.

(Image Capturing Operation Setting Unit 231)

When the image capturing operation setting unit 231 receives the notice from the image analyzing unit 251 that the person has smiled, the image capturing operation setting unit 231 issues an image capturing instruction to the image capturing unit 101. The image capturing instruction corresponds to an instruction of initiating image capturing and the image capturing unit 101 initiates image capturing.

Such a configuration allows the image capturing operation setting unit 231 to detect that a person has smiled and that an animal looks toward the camera or does a trick, even while a set delay time elapses. Therefore, even when a delay time is automatically set, the image capturing apparatus 10 can initiate image capturing at an appropriate timing without missing a shutter chance prior to the elapse of the delay time.

(Seventh Embodiment)

Next, the seventh embodiment of the present invention will be described.

Figure 9:
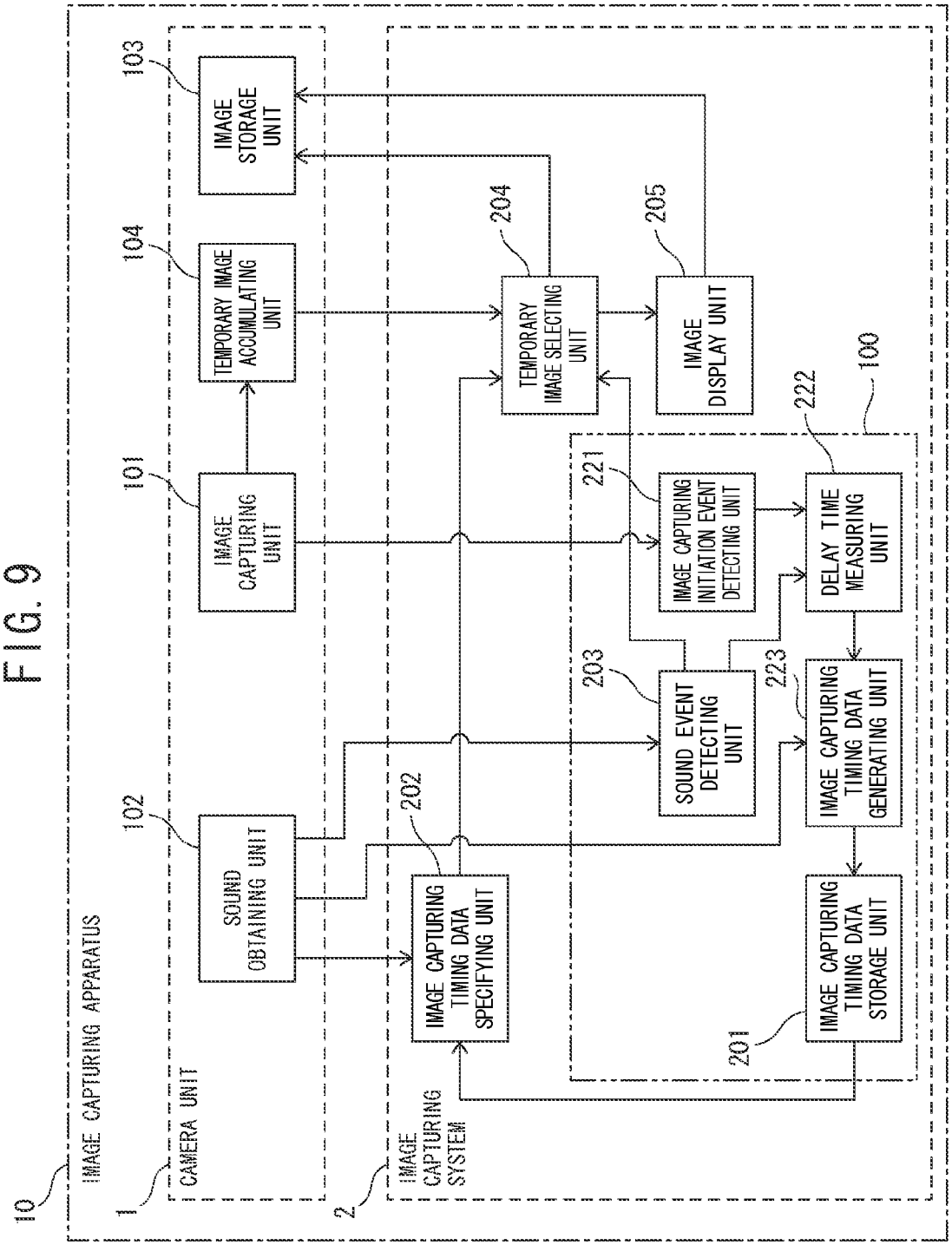
FIG. 9 is one example of a functional block diagram illustrating a configuration of an information processing apparatus of a seventh embodiment of the present invention.

FIG. 9 is one example of a functional block diagram illustrating a configuration of an information processing apparatus 100 in the seventh embodiment.

The seventh embodiment relates to the information processing apparatus 100 incorporated in an image capturing apparatus or the like, and is an embodiment focusing on the information processing apparatus 100 executing processing for generating the image capturing timing data in the image capturing apparatus 10 described in the third embodiment. The same signs are assigned in FIG. 9 to the same units as in the image capturing apparatus 10 illustrated in FIG. 5 in the third embodiment, and detailed description thereon will be omitted.

That is, the seventh embodiment is the information processing apparatus 100 incorporated in the image capturing apparatus 10 including the sound obtaining unit 102 outputting, as the sound data, a result obtained by converting an analog-input sound into digital data and analyzing the digital data and the image capturing unit 101 including a function for capturing a still image by an image capturing instruction of the user. In FIG. 9, the information processing apparatus 100 includes a sound event detecting unit 203 detecting a sound event indicating the initiation or the termination of a speech based on the sound data output from the sound obtaining unit 102; an image capturing initiation event detecting unit 221 detecting an image capturing initiation event of the image capturing unit 101 by an image capturing instruction of the user; a delay time measuring unit 222 measuring a delay time that is a difference between an occurrence time of the image capturing initiation event detected by the image capturing initiation event detecting unit 221 and an occurrence time of the sound event detected by the sound event detecting unit 203; an image capturing timing data generating unit 223 generating image capturing timing data including the delay time information on the delay time measured by the delay time measuring unit 222 and a speech information based on the sound data output by the sound obtaining unit 102, the delay time information and the speech information being associated with each other; and an image capturing timing data storage unit 201 in which the image capturing timing data generated by the image capturing timing data generating unit 223 is stored.

Description on the sound obtaining unit 102 and the image capturing unit 101 will be omitted since it will be the same as the description made in the first embodiment.

Description on the sound event detecting unit 203, the delay time measuring unit 222, the image capturing timing data generating unit 223, and the image capturing timing data storage 201 will be omitted since it will be the same as the description made in the third embodiment.

Employing the configuration of the seventh embodiment makes it possible to set a preferable condition suitable for users as the image capturing timing data stored in the image capturing timing data storage unit 201.

REFERENCE SIGNS LIST

10 Image capturing apparatus
101 Image capturing unit
102 Sound obtaining unit
103 Image storage unit
104 Temporary image accumulating unit
201 Image capturing timing data storage unit
202 Image capturing timing data specifying unit
203 Sound event detecting unit
204 Temporary image selecting unit
205 Image display unit
211 Delay time measuring unit
212 Image capturing timing data generating unit
221 Image capturing initiation event detecting unit
222 Delay time measuring unit
223 Image capturing timing data generating unit
231 Image capturing operation setting unit
241 Delay time correcting unit
251 Image analyzing unit

The invention claimed is:

1. An image capturing apparatus comprising:
  a sound obtaining unit configured to output an obtained sound as sound data;
  an image capturing unit configured to capture a still image in accordance with an image capturing instruction of a user and to capture still images automatically regardless of the image capturing instruction of the user;
  a temporary image accumulating unit in which image data of the still images captured automatically and continuously by the image capturing unit are stored;
  an image capturing timing data storage unit in which image capturing timing data is stored, the image capturing timing data including speech information and delay time information which are associated with each other;
  an image capturing timing data specifying unit configured to specify the image capturing timing data containing the speech information corresponding to the sound data output by the sound obtaining unit, from a plurality of the image capturing timing data stored in the image capturing timing data storage unit, based on the sound data output by the sound obtaining unit;
  a sound event detecting unit configured to detect a sound event indicating any one of an initiation of speech, a termination of the speech, an initiation of speech recognition processing, and a termination of the speech recognition based on the sound data; and
  a temporary image selecting unit configured to select the still image captured at a time before the sound event from the temporary image accumulating unit based on the sound event and a delay time of the image capturing timing data specified by the image capturing timing data specifying unit.

2. The image capturing apparatus according to claim 1, wherein the sound event detecting unit detects the sound event indicating the initiation of the speech or the termination of the speech based on the sound data.

3. The image capturing apparatus according to claim 1 further comprising:
  an image display unit configured to display the still image captured by the image capturing unit; and
  an image storage unit in which the still image captured by the image capturing unit is stored.

4. The image capturing apparatus according to claim 3, wherein the image display unit displays the still image selected by the temporary image selecting unit and the still images captured at around a time of capturing the still image selected by the temporary image selecting unit from the still images stored in the temporary image accumulating unit.

5. The image capturing apparatus according to claim 3, wherein the image data of the still image specified by the user from the still images displayed by the image display unit is stored in the image storage unit.

6. The image capturing apparatus according to claim 1, comprising:
   a delay time measuring unit configured to measure the delay time which is a difference between a time of capturing the still image specified by the user from the still images displayed by the image display unit and an occurrence time of the sound event detected by the sound event detecting unit; and
   an image capturing timing data generating unit configured to generate the image capturing timing data including the delay time information on the delay time measured by the delay time measuring unit and the speech information based on the sound data output by the sound obtaining unit, the delay time information and the speech information being associated with each other,
   wherein the image capturing timing data generated by the image capturing timing data generating unit is stored in the image capturing timing data storage unit.

7. The image capturing apparatus according to claim 1, comprising:
   an image capturing initiation event detecting unit configured to detect an image capturing initiation event of image capturing of the image capturing unit in accordance with the image capturing instruction of the user;
   a delay time measuring unit configured to measure the delay time which is a difference between an occurrence time of the image capturing initiation event detected by the image capturing initiation event detecting unit and an occurrence time of the sound event detected by the sound event detecting unit; and
   an image capturing timing data generating unit configured to generate the image capturing timing data including the delay time information on the delay time measured by the delay time measuring unit and the speech information based on the sound data output by the sound obtaining unit, the delay time information and the speech information being associated with each other,
   wherein the image capturing timing data generated by the image capturing timing data generating unit is stored in the image capturing timing data storage unit.

8. The image capturing apparatus according to claim 1, comprising an image capturing operation setting unit configured to set an image capturing timing of the image capturing unit based on the sound event detected by the sound event detecting unit and the delay time of the image capturing timing data specified by the image capturing timing data specifying unit.

9. The image capturing apparatus according to claim 8, wherein the image capturing operation setting unit configured to set a time after the sound event as the image capturing timing.

10. The image capturing apparatus according to claim 8, comprising a delay time correcting unit configured to correct the delay time information contained in the image capturing timing data specified by the image capturing timing data specifying unit when data obtained by image capturing of the image capturing unit in accordance with the image capturing timing set by the image capturing operation setting unit is not stored in the image storage unit.

11. An information processing apparatus incorporated in an image capturing apparatus, the image capturing apparatus comprising:
   a sound obtaining unit configured to output an obtained sound as sound data; and
   an image capturing unit configured to capture a still image in accordance with an image capturing instruction of a user,
   wherein the information processing apparatus comprising:
      a sound event detecting unit configured to detect a sound event indicating an initiation of speech or a termination of the speech based on the sound data output from the sound obtaining unit;
      an image capturing initiation event detecting unit configured to detect an image capturing initiation event of the image capturing unit in accordance with the image capturing instruction of the user;
      a delay time measuring unit configured to measure a delay time which is a difference between an occurrence time of the image capturing initiation event detected by the image capturing initiation event detecting unit and an occurrence time of the sound event detected by the sound event detecting unit;
      an image capturing timing data generating unit configured to generate image capturing timing data including delay time information on the delay time measured by the delay time measuring unit and speech information based on the sound data output by the sound obtaining unit, the delay time information and the speech information being associated with each other; and an image capturing timing data storage unit in which the image capturing timing data generated by the image capturing timing data generating unit is stored.

* * * * *